US012529317B2

(12) United States Patent
Matsuda

(10) Patent No.: US 12,529,317 B2
(45) Date of Patent: Jan. 20, 2026

(54) TURBINE WHEEL

(71) Applicant: KABUSHIKI KAISHA TOYOTA JIDOSHOKKI, Aichi-ken (JP)

(72) Inventor: Masaaki Matsuda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 18/650,165

(22) Filed: Apr. 30, 2024

(65) Prior Publication Data

US 2024/0384656 A1    Nov. 21, 2024

(30) Foreign Application Priority Data

May 16, 2023   (JP) ................................ 2023-080586

(51) Int. Cl.
*F01D 5/14*       (2006.01)

(52) U.S. Cl.
CPC .......... *F01D 5/141* (2013.01); *F05D 2220/40* (2013.01); *F05D 2230/10* (2013.01); *F05D 2230/21* (2013.01); *F05D 2240/306* (2013.01); *F05D 2250/713* (2013.01)

(58) Field of Classification Search
CPC ...... F01D 5/14; F01D 5/141; F01D 5/04–048; F05D 2220/40; F05D 2230/10; F05D 2230/21; F05D 2240/306; F05D 2250/713
See application file for complete search history.

(56) References Cited

U.S. PATENT DOCUMENTS

| | | | | |
|---|---|---|---|---|
| 2,682,925 A * | 7/1954 | Wosika | ...................... | F28C 1/00 416/223 R |
| 3,333,817 A * | 8/1967 | Rhomberg | .............. | B64C 11/18 415/181 |
| 3,975,911 A * | 8/1976 | Morgulis | .................. | F02C 6/12 60/602 |
| 5,624,234 A * | 4/1997 | Neely | .................... | F04D 29/384 416/189 |
| 8,096,777 B2 * | 1/2012 | Yokoyama | ................ | F01D 1/08 416/243 |
| 9,404,506 B2 * | 8/2016 | Masutani | .............. | F04D 29/286 |
| 11,390,333 B2 * | 7/2022 | Suk | ............................. | B64C 3/14 |
| 2010/0098548 A1 * | 4/2010 | Yokoyama | .............. | F01D 5/048 416/223 R |

(Continued)

FOREIGN PATENT DOCUMENTS

| JP | H 03-15604 A | 1/1991 |
|---|---|---|
| JP | 2020-079577 A | 5/2020 |

*Primary Examiner* — Topaz L. Elliott
(74) *Attorney, Agent, or Firm* — Greenblum & Bernstein, P.L.C.

(57) ABSTRACT

A turbine wheel includes a hub and a plurality of turbine blades. Each turbine blade includes a hub-side edge, a shroud-side edge, an inflow-side edge, and an outflow-side edge. An inlet region of each turbine blade includes an inlet portion, and a thickness decreasing portion having a thickness that gradually decreases toward the outflow-side edge. The inlet portion has a constant thickness toward the outflow-side edge, or has a thickness that gradually increases toward the outflow-side edge. The thickness decreasing portion is formed in a range where a ratio of a length from the inflow-side edge to a length between the inflow-side edge and the outflow-side edge is not more than 0.3.

2 Claims, 12 Drawing Sheets

(56) References Cited

U.S. PATENT DOCUMENTS

| | | | | |
|---|---|---|---|---|
| 2012/0027599 | A1* | 2/2012 | Masutani | F04D 29/30 |
| | | | | 416/198 R |
| 2012/0269636 | A1* | 10/2012 | Xu | F01D 5/141 |
| | | | | 416/185 |
| 2015/0354359 | A1* | 12/2015 | Matsuda | F04D 29/30 |
| | | | | 29/889.21 |
| 2015/0361802 | A1* | 12/2015 | Yoshida | F01D 5/043 |
| | | | | 415/119 |
| 2019/0202503 | A1* | 7/2019 | Suk | F01D 5/141 |
| 2020/0040737 | A1* | 2/2020 | Yokoyama | F01D 5/145 |
| 2022/0003122 | A1 | 1/2022 | Shimizu | |
| 2024/0401606 | A1* | 12/2024 | Guriev | F04D 29/284 |

* cited by examiner

TURBINE WHEEL

CROSS REFERENCE TO RELATED APPLICATIONS

This nonprovisional application is based on Japanese Patent Application No. 2023-080586 filed on May 16, 2023 with the Japan Patent Office, the entire contents of which are hereby incorporated by reference.

BACKGROUND

The present disclosure relates to a turbine wheel.

DESCRIPTION OF THE BACKGROUND ART

Japanese Patent Laying-Open No. 2020-79577 discloses a turbine wheel for use in a turbocharger. The turbine wheel includes a hub rotatable about an axis of rotation, and a plurality of turbine blades connected to the hub. A region of a negative pressure surface of each turbine blade that includes an outer edge in a radial direction and that extends in a direction parallel to the axis of rotation is additionally machined.

SUMMARY

In the turbine wheel as described in Japanese Patent Laying-Open No. 2020-79577, there exists a need to suppress the generation of a vortex on the negative pressure surface side of each turbine blade, while ensuring rigidity of an inflow-side edge of each turbine blade that is formed on a gas inflow side.

An object of the present disclosure is to provide a turbine wheel that can suppress the generation of a vortex on a negative pressure surface side of each turbine blade, while ensuring rigidity of an inflow-side edge of each turbine blade.

A turbine wheel according to an aspect of the present disclosure includes a hub that rotates about an axis of rotation, and a plurality of turbine blades connected to the hub, in which each of the plurality of turbine blades includes a hub-side edge contiguous to the hub, a shroud-side edge facing a shroud that houses the turbine wheel, an inflow-side edge formed on a gas inflow side, and an outflow-side edge formed on a gas outflow side, each of the turbine blades has an inlet region including the inflow-side edge, the inlet region includes an inlet portion including the inflow-side edge and having a shape extending from the hub-side edge to the shroud-side edge, and a thickness decreasing portion contiguous to a downstream end of the inlet portion in a direction from the inflow-side edge toward the outflow-side edge and having a thickness that gradually decreases toward the outflow-side edge, the inlet portion has a constant thickness toward the outflow-side edge, or has a thickness that gradually increases toward the outflow-side edge, and the thickness decreasing portion is formed in a range where a ratio of a length from the inflow-side edge in a meridional plane of the turbine blade to a length between the inflow-side edge and the outflow-side edge in the meridional plane is not more than 0.3.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
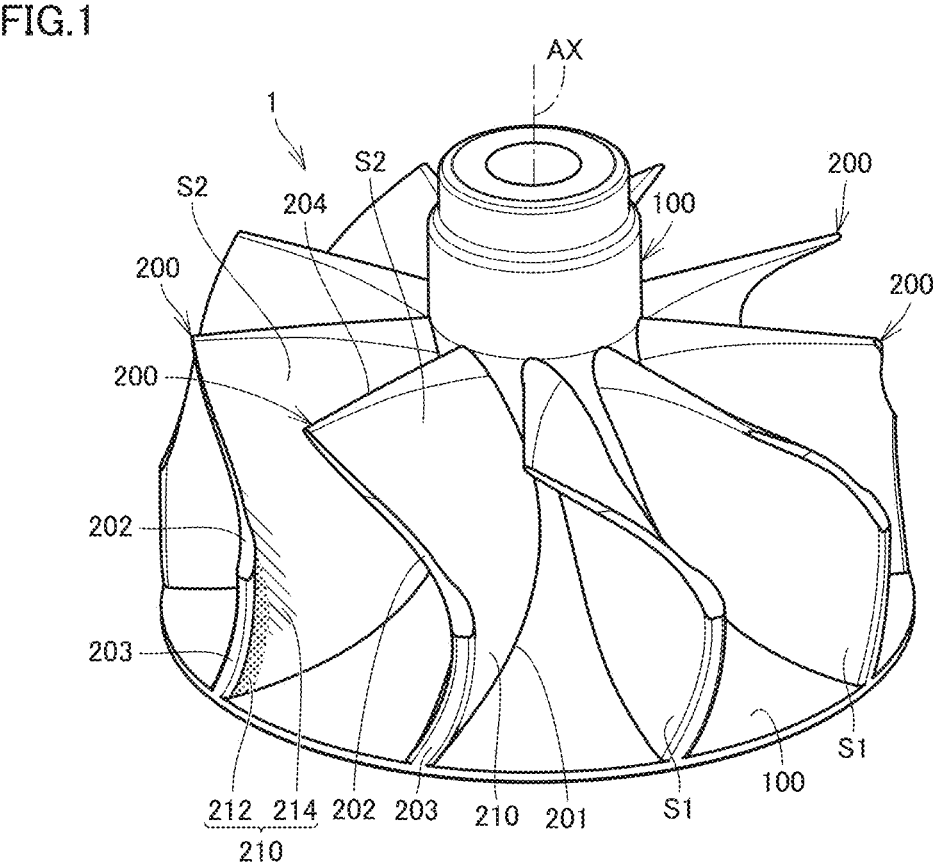
FIG. 1 is a perspective view of a turbine wheel in a first embodiment of the present disclosure.

Embodiments of the present disclosure will be described with reference to the drawings. In the drawings referenced below, the same or corresponding members are denoted by the same numerals.

First Embodiment

Figure 2:
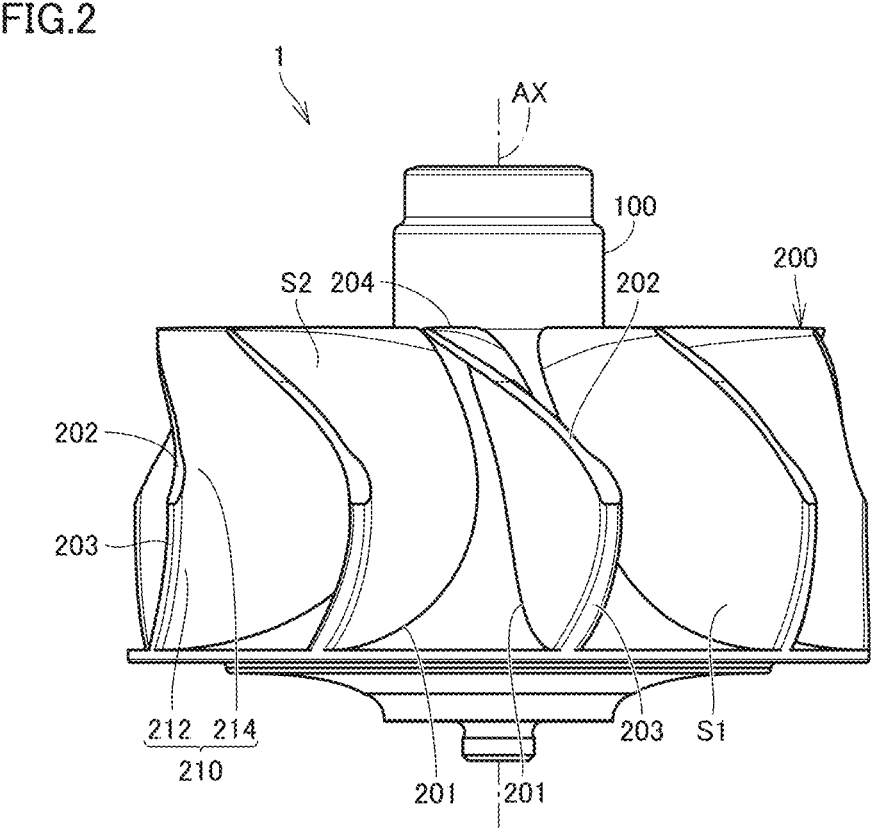
FIG. 2 is a front view of the turbine wheel shown in FIG. 1.
Figure 3:
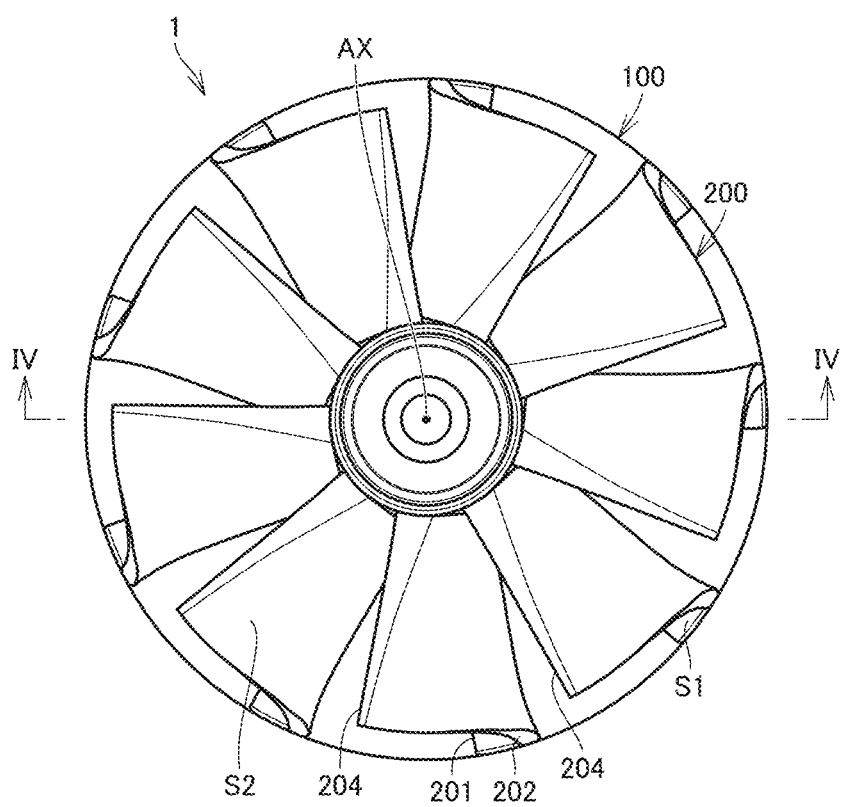
FIG. 3 is a plan view of the turbine wheel shown in FIG. 1.
Figure 4:
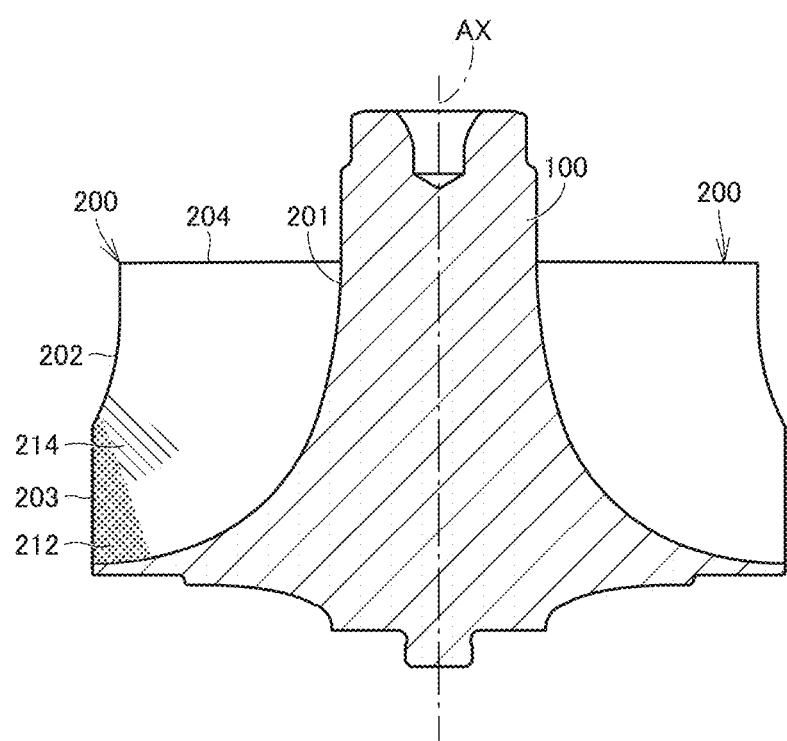
FIG. 4 is a cross-sectional view along a line IV-IV in FIG. 3.

FIG. 1 is a perspective view of a turbine wheel in a first embodiment of the present disclosure. FIG. 2 is a front view of the turbine wheel shown in FIG. 1. FIG. 3 is a plan view of the turbine wheel shown in FIG. 1. FIG. 4 is a cross-sectional view along a line IV-IV in FIG. 3.

A turbine wheel 1 in the present embodiment is preferably used in a turbocharger mounted on a vehicle. The turbine wheel 1 is made of a TiAl alloy, for example. The turbine wheel 1 is manufactured by additional machining (cutting or electrochemical machining) of a coarse material formed by casting. The coarse material may be formed by forging or the like.

As shown in FIGS. 1 to 4, the turbine wheel 1 includes a hub 100 and a plurality of turbine blades 200.

The hub 100 is rotatable about an axis of rotation AX. The hub 100 includes a part that gradually increases in diameter from one side (an upper side in FIGS. 1, 2 and 4) to the other side (a lower side in FIGS. 1, 2 and 4) in a direction of the axis of rotation.

Each turbine blade 200 is connected to the hub 100. Each turbine blade 200 has a positive pressure surface (concave surface) and a negative pressure surface (convex surface). In the present embodiment, at least a portion of the negative pressure surface (a surface curved to be convex in a direction of rotation of the hub 100) of each turbine blade 200 is additionally machined. A surface of the turbine blade 200 that is not additionally machined is formed by a casting surface S1 made of casting skin. A surface of the turbine blade 200 that is additionally machined is formed by a machining surface S2 having a surface state different from a surface state of the casting surface S1. A smooth boundary is provided between the casting surface S1 and the machining surface S2.

Each turbine blade 200 has a hub-side edge 201, a shroud-side edge 202, an inflow-side edge 203, and an outflow-side edge 204.

The hub-side edge 201 is contiguous to the hub 100. The hub-side edge 201 is formed by an end surface contiguous to the hub 100.

The shroud-side edge 202 faces a shroud (not shown) that houses the turbine wheel 1. The shroud-side edge 202 is formed by an end surface of the turbine blade 200.

The inflow-side edge (leading edge) 203 is formed on a gas inflow side. The inflow-side edge 203 couples an outer end of the hub-side edge 201 in a radial direction of the hub 100 to an outer end of the shroud-side edge 202 in the radial direction. In other words, the inflow-side edge 203 couples an end of the hub-side edge 201 on the other side (the lower side in FIGS. 1, 2 and 4) in a direction parallel to the axis of rotation AX to an end of the shroud-side edge 202 on the other side in the direction parallel to the axis of rotation AX.

The outflow-side edge (trailing edge) 204 is formed on a gas outflow side. The outflow-side edge 204 couples an inner end of the hub-side edge 201 in the radial direction to an inner end of the shroud-side edge 202 in the radial direction. In other words, the outflow-side edge 204 couples an end of the hub-side edge 201 on the one side (the upper side in FIGS. 1, 2 and 4) in the direction parallel to the axis of rotation AX to an end of the shroud-side edge 202 on the one side in the direction parallel to the axis of rotation AX. As shown in FIGS. 2 and 4, the outflow-side edge 204 may be approximately orthogonal to the axis of rotation AX.

Each turbine blade 200 has an inlet region 210 including the inflow-side edge 203. The inlet region 210 has an inlet portion 212 and a thickness decreasing portion 214. In FIGS. 1 and 4, the inlet portion 212 is indicated by a dot pattern, and the thickness decreasing portion 214 is indicated by diagonal lines.

The inlet portion 212 includes the inflow-side edge 203. The inlet portion 212 has a shape extending from the hub-side edge 201 to the shroud-side edge 202. The inlet portion 212 has a constant thickness toward the outflow-side edge 204, or has a thickness that gradually increases toward the outflow-side edge 204.

Figure 5:
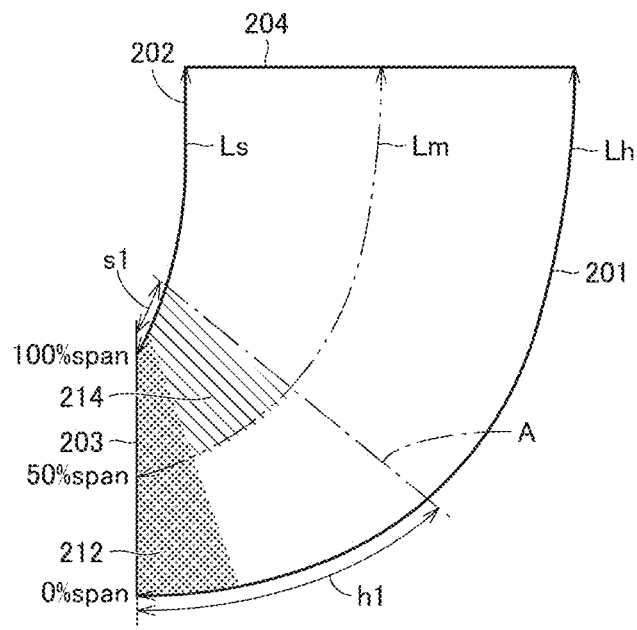
FIG. 5 schematically shows a turbine blade.
Figure 6:
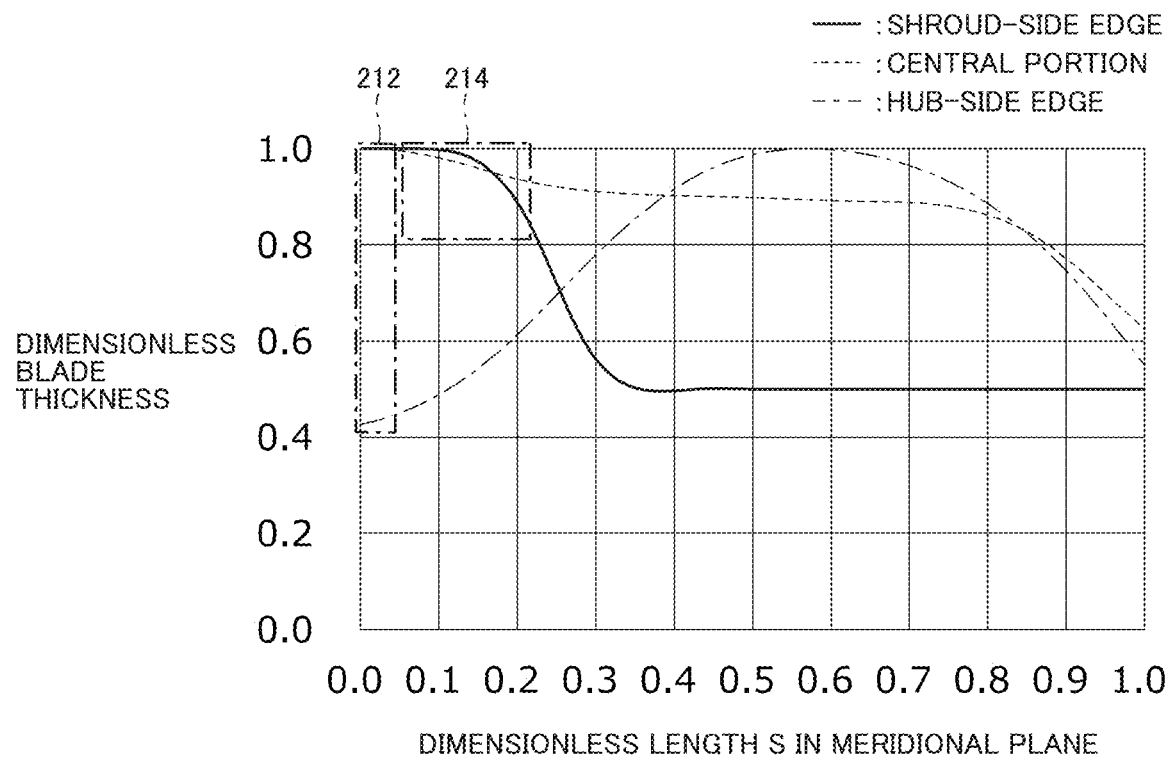
FIG. 6 is a graph showing relation between a dimensionless length in a meridional plane and a dimensionless blade thickness.

The thickness decreasing portion 214 is a part having a thickness that gradually decreases toward the outflow-side edge 204. The thickness decreasing portion 214 is contiguous to a downstream end of the inlet portion 212 in a direction from the inflow-side edge 203 toward the outflow-side edge 204 (a gas flow direction). As shown in FIGS. 5 and 6, in the present embodiment, the thickness decreasing portion 214 includes a region of each turbine blade 200 that extends from the shroud-side edge 202 to a central portion between the hub-side edge 201 and the shroud-side edge 202.

As shown in FIGS. 5 and 6, the thickness decreasing portion 214 is formed in a range where a dimensionless length S in a meridional plane is not more than 0.3. The dimensionless length S in the meridional plane means a ratio of the length from the inflow-side edge 203 along a meridian of the turbine blade 200 to the length between the inflow-side edge 203 and the outflow-side edge 204 along the meridian. That is, the thickness decreasing portion 214 is formed in a range between the inflow-side edge 203, and a part with a length that is 0.3 times as large as the length between the inflow-side edge 203 and the outflow-side edge 204 along the meridian from the inflow-side edge 203 toward the outflow-side edge 204. A dimensionless blade thickness means the thickness of a part between the inflow-side edge 203 and the outflow-side edge 204 that extends along a predetermined meridian to a maximum thickness of the part between the inflow-side edge 203 and the outflow-side edge 204 that extends along the predetermined meridian.

In FIG. 5, the entire length of a meridian of the hub-side edge 201 is denoted by Lh, the entire length of a meridian of the shroud-side edge 202 is denoted by Ls, and the entire length of a meridian of the central portion between the hub-side edge 201 and the shroud-side edge 202 is denoted by Lm. In FIG. 5, a position corresponding to the meridian of the hub-side edge 201 is 0% span, a position corresponding to the meridian of the shroud-side edge 202 is 100% span, and a position corresponding to the meridian of the central portion between the hub-side edge 201 and the shroud-side edge 202 is 50% span.

In FIG. 5, a position where the dimensionless length S along the meridian is 0.3 is denoted by a chain-dotted line A. This chain-dotted line A connects a position at a length h1 of the hub-side edge 201 to a position at a length s1 of the shroud-side edge 202. The length h1 is 0.3 times as large as the entire length Lh of the meridian of the hub-side edge 201 from an upstream end toward a downstream end of the hub-side edge 201, and the length s1 is 0.3 times as large as the entire length Ls of the meridian of the shroud-side edge 202 from an upstream end toward a downstream end of the shroud-side edge 202.

Figure 7:
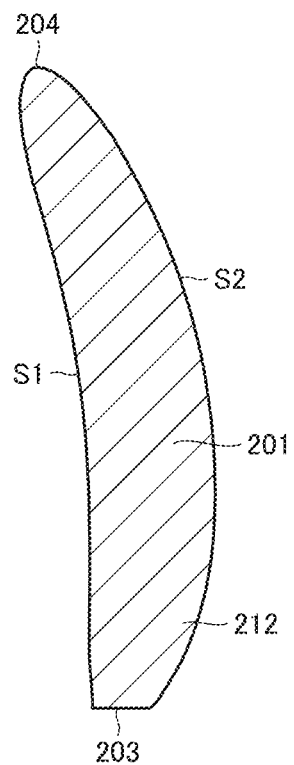
FIG. 7 is a cross-sectional view of a hub-side edge.
Figure 8:
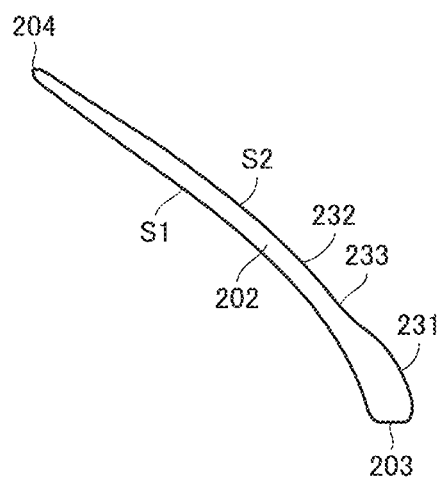
FIG. 8 is a front view of a shroud-side edge.
Figure 9:
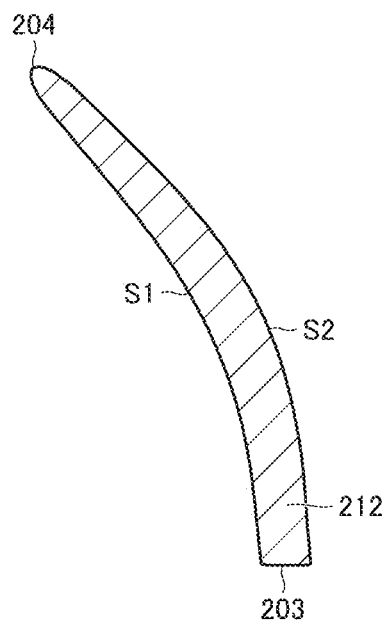
FIG. 9 is a cross-sectional view of a central portion between the hub-side edge and the shroud-side edge.
Figure 10:
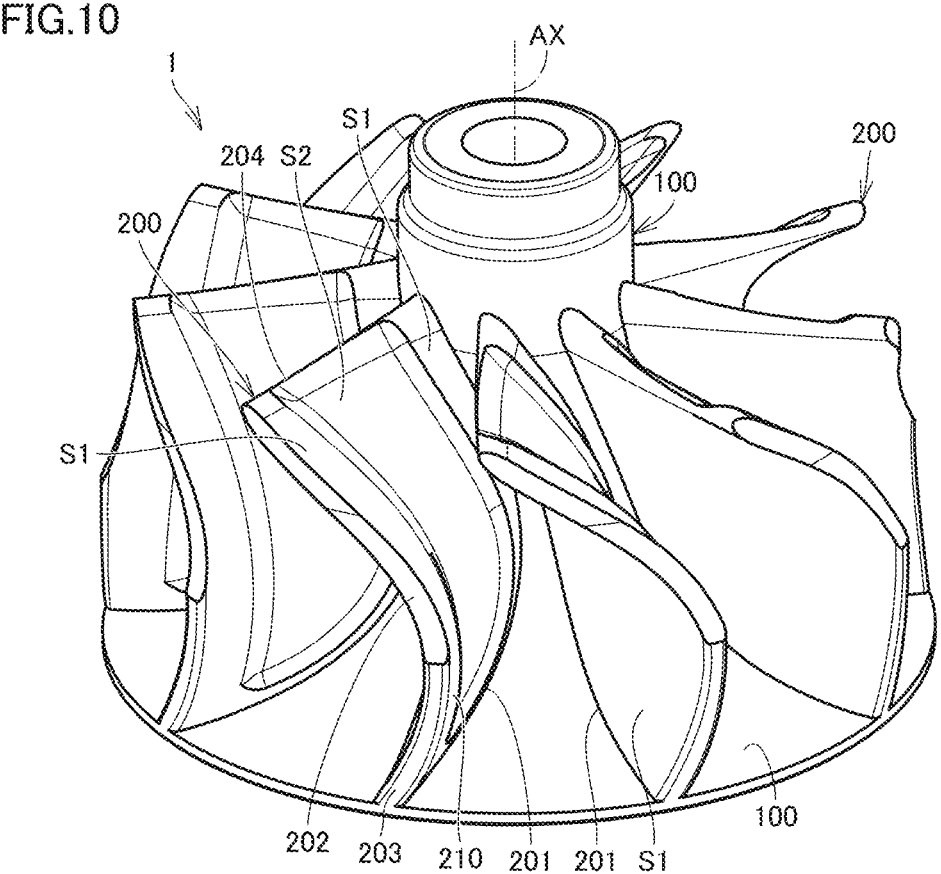
FIG. 10 is a perspective view of the turbine wheel in a second embodiment of the present disclosure.
Figure 11:
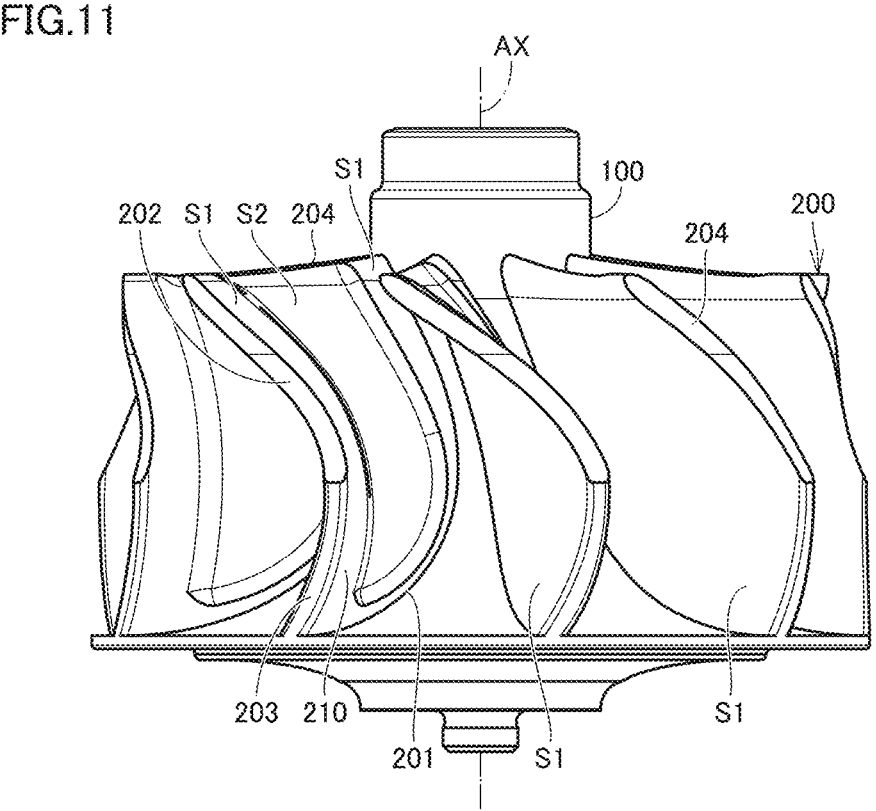
FIG. 11 is a front view of the turbine wheel shown in FIG. 10.
Figure 12:
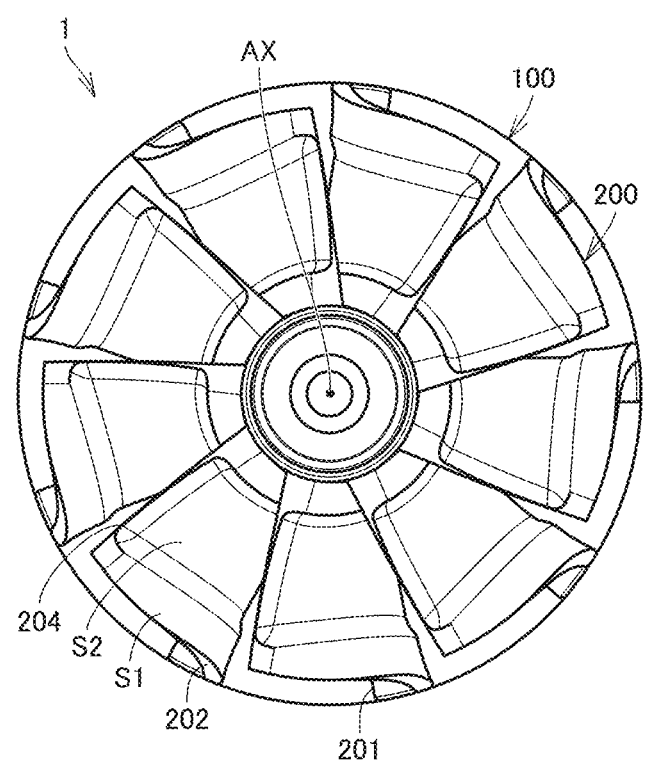
FIG. 12 is a plan view of the turbine wheel shown in FIG. 10.
Figure 13:
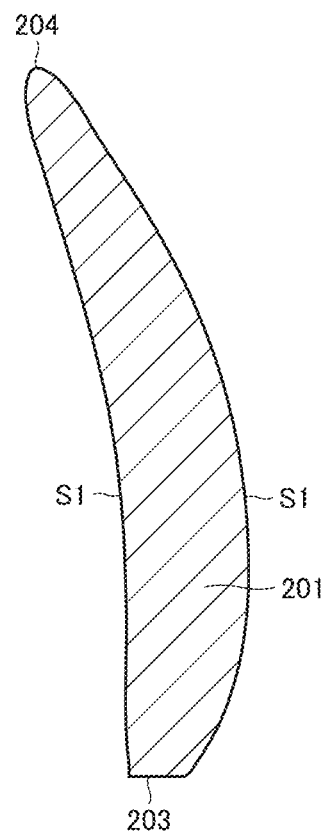
FIG. 13 is a cross-sectional view of the hub-side edge.
Figure 14:
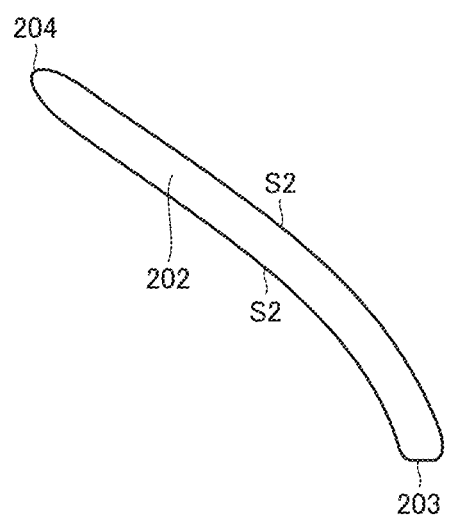
FIG. 14 is a front view of the shroud-side edge.

FIG. 7 is a cross-sectional view of the hub-side edge. FIG. 8 is a front view of the shroud-side edge. FIG. 9 is a cross-sectional view of the central portion between the hub-side edge and the shroud-side edge.

As shown in FIG. 8, the inlet region 210 has a first curved surface 231, a second curved surface 232, and a coupling surface 233. The first curved surface 231, the second curved surface 232 and the coupling surface 233 are formed on the negative pressure surface of the turbine blade 200.

The first curved surface 231 is contiguous to the inflow-side edge 203. The first curved surface 231 forms part of the inlet portion 212. The first curved surface 231 is curved to be convex in a direction from the positive pressure surface toward the negative pressure surface of the turbine blade 200 (the direction of rotation of the hub 100).

The second curved surface 232 is formed at a position spaced from the first curved surface 231 in a direction along a camber line. The second curved surface 232 is curved to be convex in the direction from the positive pressure surface toward the negative pressure surface of the turbine blade 200.

The coupling surface 233 couples the first curved surface 231 to the second curved surface 232. The coupling surface 233 forms part of the thickness decreasing portion 214. The coupling surface 233 is curved to be convex in a direction from the negative pressure surface toward the positive pressure surface of the turbine blade 200.

The first curved surface 231, the second curved surface 232 and the coupling surface 233 are formed in a range between the central portion between the hub-side edge 201 and the shroud-side edge 202 and the shroud-side edge 202.

As described above, according to the turbine wheel 1 in the present embodiment, the rigidity of the inflow-side edge 203 is ensured since each turbine blade 200 has the inlet portion 212, and the generation of a vortex on the negative pressure surface side of each turbine blade 200 is suppressed since the thickness decreasing portion 214 of each turbine blade 200 is formed in the range where the above-described ratio (the dimensionless length S in the meridional plane) is not more than 0.3.

Second Embodiment

Next, the turbine wheel 1 in a second embodiment of the present disclosure is described with reference to FIGS. 10 to 15. In the second embodiment, only the differences from the first embodiment will be described, and the description of the same structure, functions and advantageous effects as those of the first embodiment will not be repeated.

In the present embodiment, a region in the vicinity of the inflow-side edge 203 and the shroud-side edge 202 and a region in the vicinity of the hub-side edge 201 of the negative pressure surface of each turbine blade 200 are formed by the casting surface S1 that is not additionally machined.

Figure 15:
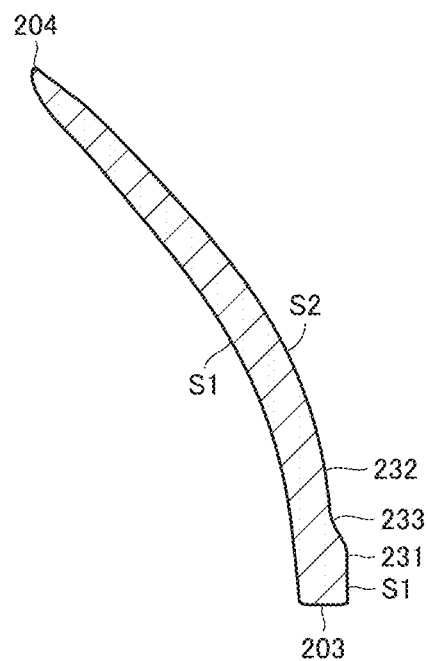
FIG. 15 is a cross-sectional view of the part between the hub-side edge and the shroud-side edge.

In the present embodiment, the thickness decreasing portion 214 is formed at the central portion between the hub-side edge 201 and the shroud-side edge 202, for example, as shown in FIG. 15.

In this aspect, the rigidity of the inflow-side edge 203 of each turbine blade 200 is effectively ensured, as compared to the turbine wheel 1 in the first embodiment.

A part of each turbine blade 200 that is additionally machined is determined as appropriate based on the ensuring of the rigidity of the inflow-side edge 203, the suppressing of the generation of a vortex by reducing the thickness of the outflow-side edge 204, and the like.

It will be understood by those skilled in the art that the exemplary embodiments described above are specific examples of the following aspects.

[Aspect 1]
A turbine wheel comprising:
a hub that rotates about an axis of rotation; and
a plurality of turbine blades connected to the hub, wherein
each of the plurality of turbine blades includes
 a hub-side edge contiguous to the hub,
 a shroud-side edge facing a shroud that houses the turbine wheel,
 an inflow-side edge formed on a gas inflow side, and
 an outflow-side edge formed on a gas outflow side,
each of the turbine blades has an inlet region including the inflow-side edge,
the inlet region includes
 an inlet portion including the inflow-side edge and having a shape extending from the hub-side edge to the shroud-side edge, and
 a thickness decreasing portion contiguous to a downstream end of the inlet portion in a direction from the inflow-side edge toward the outflow-side edge and having a thickness that gradually decreases toward the outflow-side edge,
the inlet portion has a constant thickness toward the outflow-side edge, or has a thickness that gradually increases toward the outflow-side edge, and
the thickness decreasing portion is formed in a range where a ratio of a length from the inflow-side edge in a meridional plane of the turbine blade to a length between the inflow-side edge and the outflow-side edge in the meridional plane is not more than 0.3.

According to this turbine wheel, the rigidity of the inflow-side edge is ensured since each turbine blade has the inlet portion, and the generation of a vortex on the negative pressure surface side is suppressed since the thickness decreasing portion of each turbine blade is formed in the range where the above-described ratio is not more than 0.3.

[Aspect 2]
The turbine wheel according to aspect 1, wherein
the inlet region includes
 a first curved surface contiguous to the inflow-side edge and forming part of the inlet portion,
 a second curved surface formed at a position spaced from the first curved surface in a direction along a camber line of the turbine blade, and
 a coupling surface coupling the first curved surface to the second curved surface and forming part of the thickness decreasing portion,
the first curved surface, the second curved surface and the coupling surface are formed on a negative pressure surface of the turbine blade,
the first curved surface and the second curved surface are curved to be convex in a direction from a positive pressure surface toward the negative pressure surface of the turbine blade, and
the coupling surface is curved to be convex in a direction from the negative pressure surface toward the positive pressure surface of the turbine blade.

[Aspect 3]
The turbine wheel according to aspect 2, wherein
the first curved surface, the second curved surface and the coupling surface are formed in a range between a central portion between the hub-side edge and the shroud-side edge and the shroud-side edge.

[Aspect 4]
The turbine wheel according to any one of aspects 1 to 3, wherein
a surface of the inlet portion is formed by a casting surface made of casting skin, and
a surface of the thickness decreasing portion is formed by a machining surface having a surface state different from a surface state of the casting surface.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A turbine wheel comprising:
a hub that rotates about an axis of rotation; and
a plurality of turbine blades connected to the hub, wherein
each of the plurality of turbine blades includes
 a hub-side edge contiguous to the hub,
 a shroud-side edge facing a shroud that houses the turbine wheel,
 an inflow-side edge formed on a gas inflow side, and
 an outflow-side edge formed on a gas outflow side,
each of the plurality of turbine blades has an inlet region including the inflow-side edge, the inlet region includes
 an inlet portion including the inflow-side edge and having a shape extending from the hub-side edge to the shroud-side edge, and
 a thickness decreasing portion contiguous to a downstream end of the inlet portion in a direction from the inflow-side edge toward the outflow-side edge and having a thickness that gradually decreases toward the outflow-side edge,
the inlet portion has a constant thickness toward the outflow-side edge, or has a thickness that gradually increases toward the outflow-side edge, and the thickness decreasing portion is formed in a range where a ratio of a length from the inflow-side edge in a meridional plane of the turbine blade to a length between the inflow-side edge and the outflow-side edge in the meridional plane is not more than 0.3, wherein each inlet region includes
- a first curved surface contiguous to the inflow-side edge and forming part of the inlet portion,
- a second curved surface formed at a position spaced from the first curved surface in a direction along a camber line of the turbine blade, and
- a coupling surface coupling the first curved surface to the second curved surface and forming part of the thickness decreasing portion, the first curved surface, the second curved surface and the coupling surface are formed on a negative pressure surface of the turbine blade, the first curved surface and the second curved surface are curved to be convex in a direction from a positive pressure surface toward the negative pressure surface of the turbine blade, and the coupling surface is curved to be convex in a direction from the negative pressure surface toward the positive pressure surface of the turbine blade, and wherein for each of the plurality of blades, the first curved surface, the second curved surface, and the coupling surface are formed in a range between the shroud-side edge and a central portion, wherein the central portion is halfway between a span from the hub-side edge to the shroud-side edge.

2. A turbine wheel comprising:
a hub that rotates about an axis of rotation; and
a plurality of turbine blades connected to the hub, wherein
each of the plurality of turbine blades includes
- a hub-side edge contiguous to the hub,
- a shroud-side edge facing a shroud that houses the turbine wheel,
- an inflow-side edge formed on a gas inflow side, and
- an outflow-side edge formed on a gas outflow side, each of the plurality of turbine blades has an inlet region including the inflow-side edge, the inlet region includes
- an inlet portion including the inflow-side edge and having a shape extending from the hub-side edge to the shroud-side edge, and
- a thickness decreasing portion contiguous to a downstream end of the inlet portion in a direction from the inflow-side edge toward the outflow-side edge and having a thickness that gradually decreases toward the outflow-side edge, the inlet portion has a constant thickness toward the outflow-side edge, or has a thickness that gradually increases toward the outflow-side edge, and the thickness decreasing portion is formed in a range where a ratio of a length from the inflow-side edge in a meridional plane of the turbine blade to a length between the inflow-side edge and the outflow-side edge in the meridional plane is not more than 0.3, wherein a surface of each inlet portion is formed by a casting surface made of casting skin, and a surface of each thickness decreasing portion is formed by a machining surface having a surface state different from a surface state of the casting surface.

* * * * *